March 15, 1960 — E. SCHNITZER — 2,928,670
BAND PASS SHOCK ABSORBER
Filed Sept. 30, 1957 — 3 Sheets-Sheet 1

INVENTOR
EMANUEL SCHNITZER
BY
ATTORNEYS

March 15, 1960 E. SCHNITZER 2,928,670
BAND PASS SHOCK ABSORBER
Filed Sept. 30, 1957 3 Sheets-Sheet 3

INVENTOR
EMANUEL SCHNITZER
BY
ATTORNEYS

United States Patent Office 2,928,670
Patented Mar. 15, 1960

2,928,670
BAND PASS SHOCK ABSORBER

Emanuel Schnitzer, Newport News, Va.

Application September 30, 1957, Serial No. 687,310

2 Claims. (Cl. 267—64)

(Granted under Title 35, U.S. Code (1952), sec. 266)

The invention described herein may be manufactured and used by or for the Government of the United States of America for governmental purposes without the payment of any royalties thereon or therefor.

This invention relates to shock struts for machine elements and the like with particular application to shock absorbers including a piston slidable in a fluid containing cylinder. In conventional shock absorbers of this type, when the piston under compression moves in the cylinder, the fluid is forced through a small orifice in the piston giving rise to a damping action which is roughly proportional to the square of the relative velocity of piston and cylinder. It is apparent, therefore, that the higher the disturbance frequency or rate of loading, the more resistance the absorber exhibits to relative motion until at high frequencies it is in effect a rigid link.

One of the primary objects of the invention is to filter out, in a shock absorber, loads from disturbances in certain frequency ranges or having certain rates of application while retaining the required load arresting characteristics of conventional shock absorbers in the remainder of the frequency spectrum. An object, also, is to provide simplified and improved means for placing the primary object of the invention into effect. Another object of the invention is to provide means for utilizing the metering pin of the piston in a conventional type piston-cylinder type shock absorber both as a control by telescoping displacement and a load filtering device by virtue of its hollow construction permitting fluid flow therethrough.

Still another object is to provide a shock absorber sensitive not only to displacement of the coacting parts but to the frequency of the relative movement of the parts.

A special object is to provide an arrangement in shock absorbers in which parts may be removed, replaced or adjusted without the necessity of complete disassembly of the shock absorber strut.

Other objects and many of the attendant advantages of this invention will be readily appreciated as the same becomes better understood by reference to the following detailed description when considered in connection with the accompanying drawings wherein.

Figure 1:
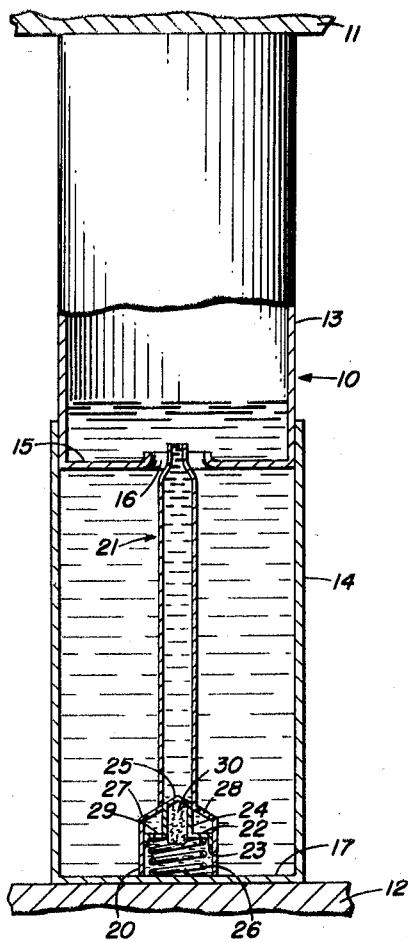
Fig. 1 is a longitudinal sectional view of one form of the shock absorber, with the metering pin fixed to the base of the absorber cylinder.

Referring to Fig. 1 a shock absorber 10 is shown adapted for insertion between machine parts 11 and 12, which may be an airplane body and a supporting wheel. This shock absorber is of the plunger type including reciprocatable members 13 and 14; attached respectively to parts 11 and 12, the members 13 and 14, being, for example, in the form of hollow cylinders, member 13 telescoping in member 14.

The lower or piston end of piston 13 is provided with end plate 15, forming a closed surface except for the centrally positioned main orifice 16. This orifice is one member of a valve mechanism, as will be explained hereinbelow, and to this end the orifice edge is curved axially to give a nozzle formation. The base or outer end of the absorber cylinder 14 is closed by plate 17, and attached to this plate is a centrally disposed control cylinder 20, a plunger or pin 21 extending from the inner or top end of the cylinder to and through the main orifice 16 in piston plate 15, but not contacting the orifice edge, so that there is a permanent minimum opening about the pin for fluid flow. It is noted that the exterior surface of the pin may be contoured so as to vary the effective orifice area as a function of the telescoping position of the strut.

Both control cylinder and pin are hollow, and a function of the control cylinder is to actuate valve means controlling flow of absorber cylinder fluid through the pin into the absorber piston above plate 15. To accomplish this function a flat annular disk 22 is provided, the disk having a depending edge skirt 23 forming a sliding bearing surface on the inside of cylinder 20. Attached to the central opening edge of this disk is a projecting tube 24 terminating in a closed valve element 25 adapted to engage the circular inner edge of pin 21. A coil spring 26, mounted inside the control cylinder 20, with ends engaging the outer or lower absorber wall 17 and the valve disk 22, normally hold the valve element 24 in closed engagement with the pin end, thereby preventing flow therethrough. Connection between the top of control cylinder 20 and the outer or base end of pin 21 is made by a flared peripheral connecting section 27 provided with radial slots 28 thereabout for free fluid communication from the shock absorber cylinder 14 to the space about valve element 25. It is apparent that an opening of valve 25, fluid communication is established between the cylinder and piston through pin 21. A bleed orifice is formed in annular valve disc 22 and a nonsaturable compressible material such as sponge rubber with nonconnected air holes distributed therein is inserted either in valve tube 24 or somewhere in the control cylinder 20 between plates 22 and 17.

In the operation of the described shock absorber, it is assumed that the cylinder 14 is filled with a pressure transmitting fluid, such as oil, and the piston 13 is gasfilled, as with air. Preferably the liquid from cylinder 14 overflows into piston 13 to cover the main piston orifice 16, as shown in the figure. Under the influence of compression applied axially to the strut, where there is a slow rate of increase of the pressure in the lower cylinder 14, the pressure, building up at a slow rate, forces liquid through the annular space in main orifice 16 around the outside tip of pin 21, thus compressing the air in piston 13 to absorb shock. The magnitude of the load will be controlled by the telescoped position or displacement of the strut. Also, fluid will be forced into the control cylinder 20 through the slots 28 at the base of the pin and thence through the bleed orifice 29 into the region below the valve element 25. Since the pressure increases slowly in cylinder 14, the bleed orifice does not present a serious restriction to fluid flow through the valve plunger. Consequently, the spring 26 will maintain the valve in its up or closed position while the volume of compressible material will become smaller as the fluid pressure increases below the valve element. Thus, this shock strut, for low rates of loading, will behave in a manner similar to a conventional aircraft shock strut with a metering pin.

For high rates of loading, the bleed orifice 29 will offer serious resistance to the transfer of fluid into the control cylinder 20 and, in consequence, the pressure difference above and below the valve disk 22 will cause it to move downwardly, opening valve element 25 to flow of liquid from the absorber cylinder 14, through control cylinder slots 28 and pin 21 and into the upper piston 13. Hence for these higher loading rates, the load transmission is markedly reduced, the shock absorber being effective for load shock only for the lower predetermined rates of load application. It is of note that damping control in the described shock absorber is secured through mechanism sensitive not only to relative displacement of the absorber elements but also to the frequency or rate of application of the loads. Since the liquid flow through the pin will usually be much greater than that around it, for rapidly applied loads, the rate control will, as a general rule, far outweigh the displacement control, in alleviating load in this type of strut.

Figure 2:
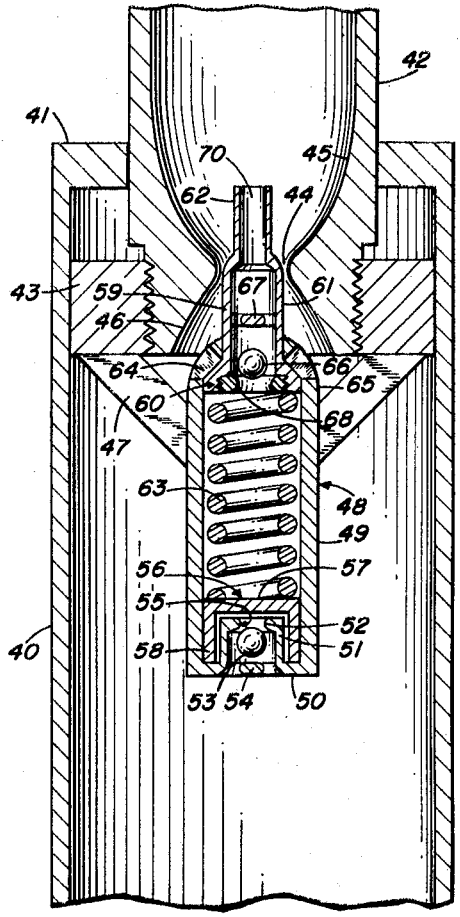
Fig. 2 is a view of a modified form of the absorber with the metering pin fixed to and depending from the piston head within the cylinder.

Fig. 2 illustrates a modified form of the shock absorber, this form utilizing, also, the hollow type pin for fluid flow. In this figure, the hollow shock absorber lower cylinder 40, at its open upper end, is provided with an inner flange 41 with a coaxial cylindrical surface on its inner side for sliding engagement with the outer wall of the hollow shock absorber upper piston cylinder 42. In turn, the lower open end of piston 42 is provided with a terminal external flange 43, screwthreaded to the piston, the outer flange surface being cylindrical and forming a sliding contact with the inner wall of hollow cylinder 40. These two flanges 41 and 43 form terminal walls for a variable sized chamber which serves as a load rate sensitive buffing means as described in a copending application, Serial No. 686,800, filed September 25, 1957 by Emanuel Schnitzer.

The lower open end of the piston is formed internally as a nozzle with a restricted orifice 44 and upper and lower diverging sections 45 and 46. Supported from piston flanges 43 by spider 47 is a control unit 48. This unit has a main cylindrical section 49 coaxial with the absorber cylinder 40 and extending directly below piston orifice 44. The section 49 is hollow and at its lower end is formed with an inner flange 50, terminating in a reversed terminal valve cylinder 51 of reduced diameter, the inner free end of this terminal cylinder, in turn, being formed with a radial valve seat 52 for a check valve ball 53, the terminal cylinder 51 forming a housing for the ball 53, a stop bar 54 being fixed across the open cylinder end to retain the ball in place. The valve seat 52, at one point, is provided with a small axial edge duct 55 which serves to permit liquid flow through valve 52, 53 when the ball is seated in closed position. Overlying the terminal valve unit 52, 53 is a piston 56 having a main transverse pressure surface plate 57 extending across the control cylinder 49 directly above the terminal valve and a cylindrical skirt 58 normally surrounding the terminal valve cylinder 51, the outer skirt surface having sliding engagement with the inner surface of control cylinder 49 and the open end of the skirt resting on the terminal flange 50 of the control unit.

The upper end of control cylinder 49 is constricted to form a terminal opening of a diameter less than that of the control cylinder and a plunger or pin 59 is slidably mounted in this opening so that it projects above cylinder 49 into and through the main piston orifice 44. This plunger is hollow to form a passage 70, and the lower plunger end, inside control cylinder 49, is expanded to form a second piston 60, this piston having a cylindrical side wall slidably engaging the upper inner surface of the control cylinder. The plunger is constructed in two sections, a lower section 61 having a diameter such that when the plunger is in its uppermost position the flow area in piston orifice 44 is at its minimum value, and an upper section 62 of lesser diameter such that, when the plunger is moved downwardly, it will permit an increased flow of liquid through orifice 44. Coil spring 63 inside the control cylinder 49 and energizing both piston 56 and piston 60 normally holds both pistons at the outer limits of movement, as shown in Fig. 2.

Annular ports 64 are placed radially around the constriction 65 at the top of the control cylinder 49. Also, a check valve of the ball type similar to lower valve 52, 53 is provided at the base of the pin inside the control cylinder. This valve includes a ball 66 movable in the pin between an upper stop bar 67 and the valve seat 68 formed of a curved inwardly projecting flange at the lower end of the pin.

The operation of the strut of Fig. 2 will now be described. When the two piston and receiving cylinders 40 and 42 are telescoped together with a slowly increasing velocity, the pressure in the receiving cylinder 40 builds up at a slow rate, forcing fluid through the main orifice 44 around the plunger 59 into the piston cylinder 42. Fluid pressure is, also, applied to the top piston 60 in control cylinder 49, thus tending to push this piston downwardly; and the valve ball 53 in the bottom piston is moved upwardly to close valve 52, 53. However, since the pressure rise is gradual, fluid is able to flow through valve seat slot 55 at a rate large enough to force piston 56 upwardly, compressing spring 63 and thus maintaining the plunger 59 in its up equilibrium position. Fluid trapped between plunger 59 and piston 56 is forced upward through the ball valve 66, 68 and hollow plunger duct 70 to the piston cylinder 42. It is thus apparent that, for slow rates of load application, the low pass shock absorber described behaves as a conventional fixed orifice shock absorber.

When the force or motion is applied rapidly to this shock absorber, fluid cannot flow fast enough through duct 55 to move piston 56 upwardly to balance the downward force applied to plunger piston 60 through port 64. Consequently, plunger 59 moves downwardly so that the upper plunger section of reduced diameter is positioned within main orifice 44. This allows a rapid flow of fluid through the main orifice 44 permitting the strut to telescope rapidly and preventing development of a large load in the shock absorber.

When the direction of the telescoping motions is reversed so that the shock strut tends to extend, the pressure in the lower strut cylinder drops off while that in the upper piston cylinder, by virtue of the compressed air in the cylinder, remains high. Thus, the pressure applied through ports 64 drops off and the pressure applied upward on the lower check valve ball 53 also drops off, allowing this ball to drop down, thus opening this valve. At the same time, fluid from the upper piston cylinder 42 is forced downward through plunger 59, forcing ball 66 downward to close the upper check valve. The downward pressure of upper cylinder 42, on plunger 59 forces the plunger downwardly, compressing spring 63 with the result that piston 56 is rapidly moved in a downward direction, thus moving fluid through the lower check valve 52, 53 into the lower cylinder 40. This positions section 62 of plunger 59 in orifice 44, allowing fluid in the upper cylinder 42 to be returned in increased volume through orifice 44 into the lower cylinder. Thus, the strut is allowed to expand rapidly in order to re-cycle itself for subsequently applied load pulses having low or high rates of loading.

Figure 3:
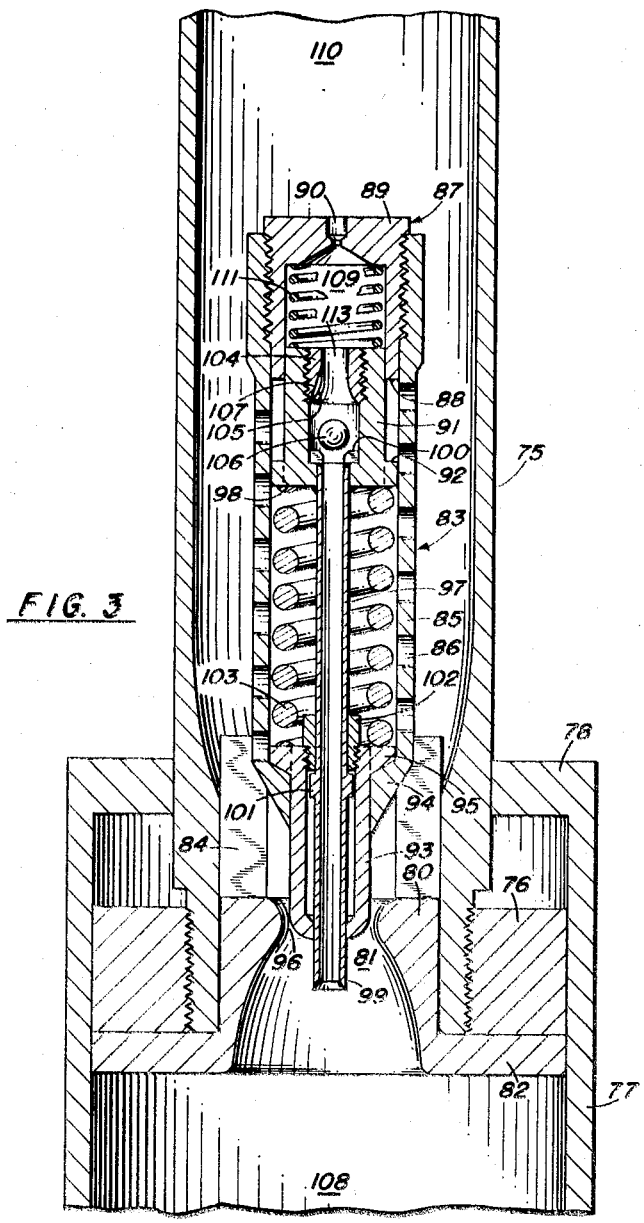
Fig. 3 is a further modification of the invention showing the metering pin fixed to and mounted within the shock absorber piston.

For some uses, it is desirable that the control unit be placed in the piston cylinder 42 instead of the lower cylinder, as in the structures of Figs. 1 and 2. Fig. 3 illustrates such an arrangement. In this figure, the upper piston cylinder 75 is screw-threaded externally at the lower end thereof, as in the structure of Fig. 2, to receive flange 76 which, in turn, forms a sliding contact with the inner wall of lower cylinder 77. The upper wall end of cylinder 77 terminates in an internal flange 78 adapted to form a sliding contact with the outer wall of piston cylinder 75, similar to the showing of Fig. 2. A short tube 80 is positioned inside and contacting the lower end of cylinder 75, the inner diameter of this tube contracting, moving upwardly, to form the main orifice 81 between cylinders 75 and 77. The lower end of tube 80 terminates in a radial flat ring 82, abutting the lower ends of cylinder 75 and contact flange 76, to which parts the ring is attached by any appropriate means.

The control unit 83 is an elongated tubular member mounted wholly within the upper cylinder by means of spider 84, the spider being spaced around and attached to the unit base at the lower end of cylinder 75 above orifice tube 80. The side wall of control unit 83 is defined by a cylindrical sleeve section 85 provided with perforations 86 throughout its length to permit free flow of fluids through the wall.

The upper end of the cylindrical sleeve section 85 is enlarged and internally threaded to provide holding means for a terminal cylinder 87 open at its lower end 88 and closed at its upper end 89 except for a small centrally placed orifice 90. A piston 91 fits closely in cylinder 87 for reciprocation therein and is provided, also, at its base end, with annular projections 92, forming bearing surfaces on the inner wall of the cylindrical sleeve section 85, as will be explained hereinbelow.

At the lower end of section 85 of the control unit is tubular plunger 93, the terminal wall of this section being constricted to form an elongated bearing member 94 in contact with the exterior surface of the plunger. The plunger is circular in section, bearing an external flange 95 at its upper end for limiting the downward movement of the plunger through contact with the constricted bearing 94 end of section 85. The lower end of the plunger, lies inside the main cylinder orifice 81 and defines with said orifice wall the minimum annular area 96 for fluid passage between the main shock absorber cylinders. To facilitate its use as a valve, the plunger is inwardly curved at its lower end to form with the inner tube 80 an annular passage way with diverging walls.

A tube 97 extends from within piston 91, through an axial conduit in piston head 98, and along the central axis of cylindrical sleeve section 85 to and through the plunger 93, the lower tube end extending beyond the plunger and the area of greatest constriction in main orifice tube 80. This tube is provided with an annular flange 100, at its upper end, which is attached to the piston head wall surrounding the opening through which tube 97 extends. Upward movement of the tube moves the plunger upwardly. This is accomplished by an annular flange, forming stop 101, positioned on the tube within plunger 93 beneath the apertured plug 102 in the top of the plunger. A coil spring 103 placed between piston 98 and plunger 93, inside section 85, serves to hold these movable elements at the limits of movement as determined by the flange elements 100 and 101 on tube 97, with flange 101 contacting the bottom of plug 102.

Inside hollow piston 91, at its outer end, is inserted a threaded nipple 104 providing a central opening which is flared outwardly adjacent its inner end to provide a seat 105 for a ball 106. This ball serves as a check valve and when fluid flows upwardly through the piston 91 the ball is carried into closure position on the flared seat. This closure, however, is not complete, since a bypass duct 107 is formed in the seat wall so that when the check valve is closed, a certain amount of leakage flow bypasses the closure. When pressure of fluid is reversed in piston 91, or under normal gravity conditions, the ball seats at the top of tube 97, the flange 100 being radially grooved to permit free fluid flow around the ball.

The operation of the control unit of Fig. 3 follows. Under the influence of a slowly applied load, the pressure in the lower cylinder 77, and thus in region 108, increases at a slow rate forcing fluid upward through the annulus 81 and tube 97, moving ball 106 upwardly to close check valve 105, 106 except for the leakage flow through duct 107 into chamber 109 and out through top orifice 90. Duct 107 is so sized, in comparison with orifice 90, that the pressure in chamber 109 is roughly the mean value between the pressure in regions 108 and 110 of the shock absorber cylinders; also, piston 91 is so sized with respect to plunger 93, that, under the influence of the mentioned low pressure, the downward force on piston 91 is slightly larger than the upward force on plunger 93. Accordingly, as the pressure slowly increases in region 108 and at a still lower rate in chamber 109 of cylindrical sleeve 87, piston 91 is forced downwardly, compressing spring 103 which, in turn, maintains plunger 93 in its bottom or equilibrium position.

Under the influence of a rapid rate of loading, fluid cannot flow rapidly enough through duct 107 around piston check valve 105, 106, and, as a consequence, piston 91 is not forced downwardly with sufficient speed to maintain plunger 93 at its lower equilibrium point. Therefore, plunger 93 rises, enlarging the annular flow area through main orifice 81, which, in turn, allows fluid to flow rapidly from the lower cylinder, in region 108, into the region 110 of upper cylinder 75. Thus, the strut telescopes rapidly, developing only a small load between the coacting strut members.

When the load on the strut reverses, pressure in region 108 decreases and that in region 110, by virtue of the air pressure in the upper cylinder, remains high. Since the upper cylinder pressure is instantly communicated to the lower surface of piston 91 and the upper surface of plunger 93, the two units tend to separate until stop 101 comes into contact with plug 102. Further, since the cross sectional area of piston 91 is roughly of the order of twice the effective cross sectional area of plunger 93, a large net upward force exists on piston 91. This piston is, therefore, driven upwardly, pulling with it plunger 93 and rapidly emptying chamber 109 of cylindrical sleeve 87 into region 108 through open check valve 105, 106. By this action, the annular main orifice area 96 is again increased to its larger value, allowing the rapid flow of fluid from region 110 in the upper cylinder through main orifice 81 into the lower cylinder with a resultant rapid telescoping extension of the shock strut in preparation for the next cycle. If desired, a weak spring 111, can be located in chamber 109, as shown, to maintain piston 91, and therefore plunger 93, in the lower or equilibrium position, especially after re-cycling of the strut.

Figure 4:
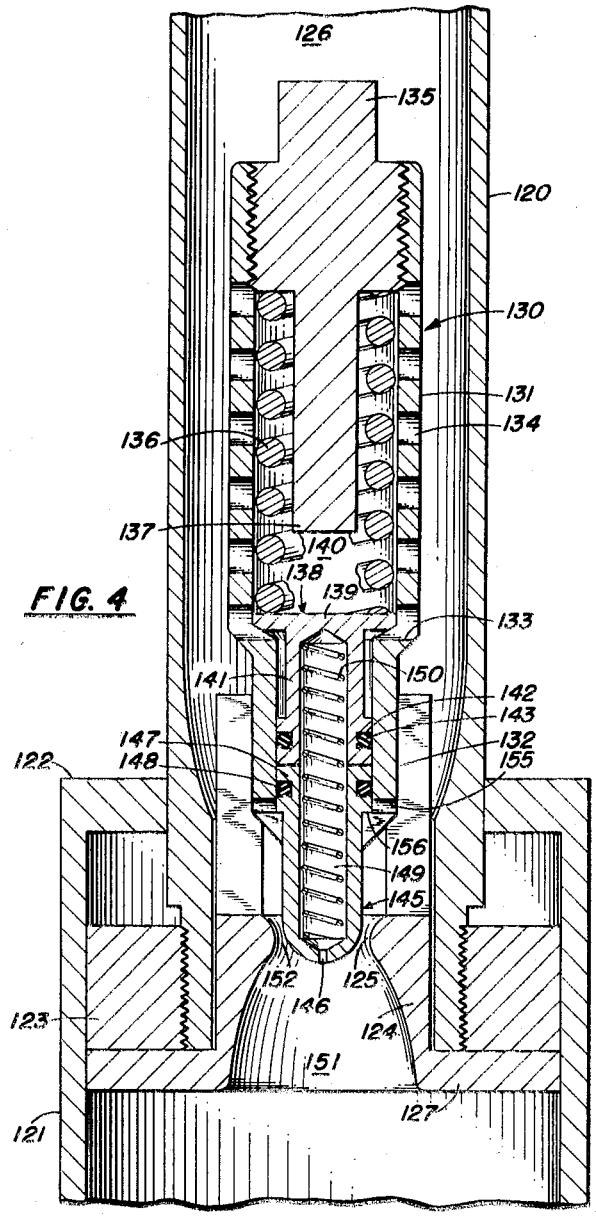
Fig. 4 is a modification of the absorber construction of Fig. 3.

In Fig. 4 is illustrated a second form of control unit completely enclosed in the upper or piston cylinder of the shock absorber. In this arrangement, the piston and receiving cylinders 120 and 121 are slidingly interengaged by interlocking flanges 122, and 123, as shown in the Fig. 3 construction. Similarly, also a base tube 124, with an upper construction defining a main orifice 125 is placed at the lower end of the upper cylinder chamber 126, a radial flange 127 at its lower edge fastening the tube to the cylinder.

The control unit 130 includes a main tubular section 131 of larger diameter and a lesser tubular section 132 of reduced diameter the sections being joined end to end by the joint 133. Main section 131 is perforated with a plurality of openings 134 for fluid flow therethrough, and at its upper end is internally threaded to receive a plug 135, forming a stop for one end of coil spring 136 extending lengthwise inside the main section. A stop 137 depends from plug 135 to limit the movement of piston 138. This piston is positioned at the lower end of control section 131 and includes the piston head 139 extending transversely across the chamber 140 within main control section 131 and a tubular skirt 141 provided with a lower end groove 142 in which a circular ring seal 143 is normally positioned for sliding contact with the inner surface of control section 132. The offset in joint 133 between the main and lesser control sections 131 and 132 serves as a stop for holding piston 138 at its normal down limit.

Plunger 145 is also mounted for sliding movement in smaller section 132, this plunger being in the form of an inverted and elongated thimble, with a small bleed orifice 146 centrally placed in its lower closed end and with an annular grooved flange 147 containing a circular ring seal 148 around its upper free end. This upper end is adjacent the lower sealed end of piston 138 and moves in the same smaller section enclosure. The lower limit of movement of the plunger 145 is fixed by an annular shoulder 156 at the lower end of section 132, engaging the lower protruding face of the groove flange 147.

Since both piston skirt 141 and plunger 145 are hollow and possess open adjoining ends, a chamber 149 is formed by these elements, this chamber being of variable length, depending on the relative movement of piston and plunger. A weak coiled spring inside both plunger and piston tends to force these elements apart but such action is normally prevented by the greater downward force of stronger spring 136, the latter being held at its upper end by plug 135 and pressing piston 138 against the joint stop 133.

In use, under the influence of a slowly applied force tending to telescope the upper and lower strut clyinders together, the fluid pressure in lower cylinder space 151 rises slowly, forcing fluid through the annular passage 152 in main orifice 125 and, also, through the bleed orifice 146 into region 149 between plunger 145 and piston 138. Since the pressure rise is gradual, orifice 146 does not present an important resistance to the flow of fluid into space 149. Consequently, the pressure in region 149 builds up at approximately the same rate as that in region 151 with the result that piston 138 is forced upward compressing spring 136 to such a value that the spring force down on piston head balances the combined force exerted by the fluid pressure in region 149 and the weak spring 150. Since the cross sectional area of the top of plunger 145 is greater than the cross sectional area of the bottom of this plunger, a net downward force is exerted which tends to maintain plunger 145 in its bottom or equilibrium position.

Under the influence of a rapidly applied load, the pressure in region 151 rises rapidly and orifice 146 presents a considerable resistance to the flow of fluid into region 149, with the result that spring 136 is not compressed sufficiently to balance the upper force on plunger 145 when this plunger is in the down position. Consequently, plunger 145 rises, opening widely the main orifice passage 152 and allowing rapid transfer of fluid from region 151 of the lower main cylinder to region 126 of the upper main cylinder. Thus, the shock strut elements are allowed to telescope rapidly with the result that only a small load is developed in the strut.

It is noted that holes 155 are provided radially in the smaller control section 132 just above the stop shoulder 156 to prevent trapping of fluid below flange 147 on plunger 145 when the plunger is forced upwardly to form an annular space below flange 147. It is noted, further, that although the constructions of Figs. 2 and 3 operate to retract the plunger from the main orifice during rebound to permit rapid recycling of the shock strut for the next load pulse, the structure of Fig. 4 does not so operate, allowing only a slow telescoping during rebound. This is desirable in some installations and uses. It is pointed out, further, that in all of the structural forms herein disclosed, the plunger or pin movable in the main orifice of the upper or piston cylinder serves the dual function of varying fluid flow through the orifice by varying the size of the annular flow area and also by passing fluid, under certain conditions of load application, through the pin itself.

This application is a continuation-in-part of my copending application Serial No. 528,563, filed August 15, 1955, now Patent Number 2,866,633.

Obviously many modifications and variations of the present invention are possible in the light of the above teachings. It is therefore to be understood that within the scope of the appended claims the invention may be practiced otherwise than as specifically described.

What is claimed is:

1. A shock absorber for connection between two machine parts, comprising a hollow cylinder forming a piston connected to one part, a hollow cylinder forming a receiver connected to the other part, said piston having telescoping connection with said receiver, a piston head having a main orifice therein at the compression end of said piston, a hollow plunger forming an axial passage way and having a free open end positioned in said main orifice, a cylindrical sleeve mounted on one of said cylinders, said plunger having sliding connection to one end of said cylindrical sleeve in continuation thereof, a piston slidingly movable in the other end of said cylindrical sleeve, a closure wall at the other end of said cylindrical sleeve beyond said cylindrical sleeve piston, a constricted orifice in said closure wall, an axial conduit through said cylindrical sleeve piston, a tube connected between said conduit and plunger and passing through said plunger to the region of said main orifice means permitting sliding engagement of said tube and plunger, a valve in said cylindrical sleeve piston for controlling fluid flow in said tube, a bleed orifice by-passing said valve, spring means for holding said cylindrical sleeve piston displaced from said plunger and means for limiting the relative movement of said cylindrical sleeve and plunger, said cylindrical sleeve having perforations therein.

2. A shock absorber for connection between two machine parts, comprising a hollow cylinder forming a piston connected to one part, a hollow cylinder forming a receiver connected to the other part, said piston having a telescoping connection within said receiver, a piston head having a central orifice therein at the compression end of said piston, a cylindrical sleeve having perforations in the wall thereof carried by said piston head concentric with said central orifice, a plunger having an axial passage way slidable in one end of said cylindrical sleeve and having a free open end positioned in said central orifice, a piston having an axial conduit slidable in the other end of said cylindrical sleeve, resilient means interposed between said plunger and said cylindrical sleeve piston, a wall provided with a constricted orifice closing the free end of said cylindrical sleeve, a tube having a free open end positioned adjacent said central orifice and slidably passing through said plunger axial passage way and connected at the other end thereof to said cylindrical sleeve piston for communication with said conduit, and a valve in said conduit for controlling fluid flow in said tube.

References Cited in the file of this patent

UNITED STATES PATENTS

| | | |
|---|---|---|
| 2,095,112 | Wallace | Oct. 5, 1937 |
| 2,381,532 | Focht | Aug. 7, 1945 |
| 2,439,349 | Tack et al. | Apr. 6, 1948 |
| 2,516,667 | Bachman | July 25, 1950 |
| 2,570,362 | Mercier | Oct. 9, 1951 |

FOREIGN PATENTS

| | | |
|---|---|---|
| 777,611 | France | Dec. 5, 1934 |
| 597,996 | Great Britain | Feb. 9, 1948 |
| 992,347 | France | July 11, 1951 |